Sept. 9, 1969          P. L. RUBEN          3,466,114

FOUR ELEMENT TRIPLET PHOTOGRAPHIC OBJECTIVE

Filed May 1, 1967

PAUL L. RUBEN
INVENTOR.

BY

ATTORNEYS

United States Patent Office 3,466,114
Patented Sept. 9, 1969

3,466,114
FOUR ELEMENT TRIPLET PHOTOGRAPHIC OBJECTIVE
Paul L. Ruben, Penfield, N.Y., assignor to Eastman Kodak Company, Rochester, N.Y., a corporation of New Jersey
Filed May 1, 1967, Ser. No. 635,224
Int. Cl. G02b 9/34, 9/18
U.S. Cl. 350—206                               2 Claims

ABSTRACT OF THE DISCLOSURE

A photographic objective comprising three air-spaced components, the front component being a simple positive element, the middle component being a simple negative biconcave element, and the rear component being a compound positive component which consists of two cemented elements of opposite refractive power with the cemented surface convex towards the middle element.

---

Figure 1:
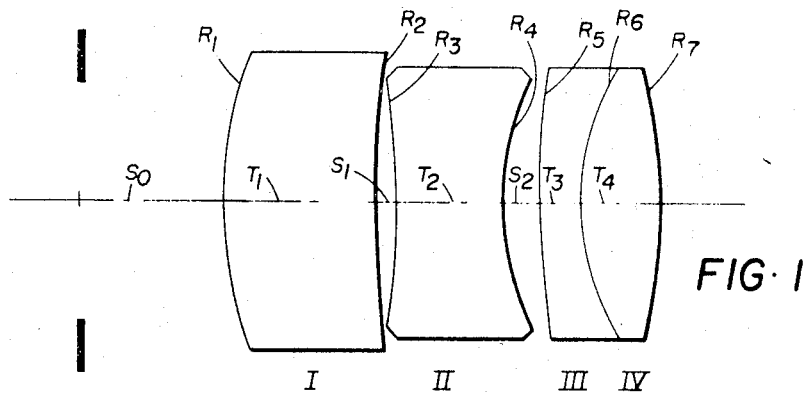

This invention relates to four elements, three component photographic objectives which are well corrected for all aberrations. More specifically, this invention relates to photographic objectives comprising three airspaced components, namely a simple positive front component, a simple negative biconcave middle component and a compound positive rear component which consists of two cemented elements of opposite refractive power with the cemented elements of opposite refractive power with the cemented surface convex towards the middle element.

It is an object of this invention to provide improved four element triplet photographic objectives which are exceptionally well corrected for spherical, comatic, astigmatic, and chromatic aberrations, for field curvature and distortion.

It is another object of this invention to provide front-stop triplet photographic objectives which are corrected for relative apertures up to $f/2.7$.

It is still another object of this invention to provide well corrected front-stop triplet objectives, the front and rear components of which may be mounted in edge contact with the middle component.

Further objects and advantages will be found in the details on construction disclosed in the accompanying examples and drawings.

These objects are accomplished according to the present invention by four element, three component lenses of the type described above in which the indices of refraction of the front and rear convergent elements in each lens with respect to the D line of the spectrum (587.6 m$\mu$) is 1.75 or greater, and in which the front two components are exceptionally thick. The front component in each lens is thicker than the combined thicknesses of the two elements of the compound rear component. The use of such high refractive indexes in the positive components and the use of such thick elements for the front two components reduce spherical aberrations both on and off the optical axis and permit the selection of surface curvatures to provide an exceptionally flat field.

Figure 2:
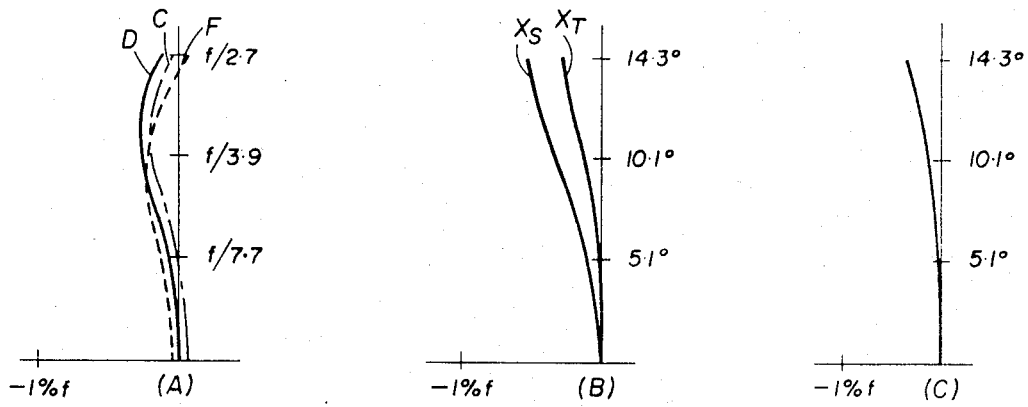

In the drawings:

FIG. 1 is a sectional view of a projection lens embodying the invention with the long conjugate on the left;

FIG. 2 comprises a set of correction curves for the lens disclosed in Example 1 below, showing (a) the spherical aberration curves for the C, D and F lines of the spectrum, (b) the curves for sagittal and tangential astigmatism, and (c) the curve for distortion.

Figure 3:
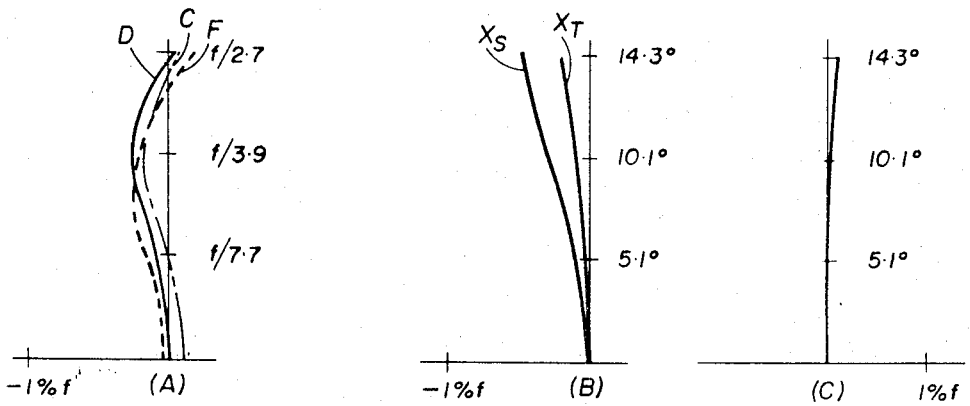

FIG. 3 is a set of correction curves similar to those in FIG. 2 for the lens disclosed in Example 2 below.

The lens in FIG. 1 comprises three airspaced components, namely a simple positive meniscus front element I, a simple negative biconcave middle element II, and a compound positive rear component which consists of two cemented elements III and IV of opposite refractive power with the cemented surface convex towards the middle element. Element III is convex-concave, and element IV is convex. Both the front and rear components may be in edge contact with the middle component.

Numerical data for constructing two typical photographic objectives of focal length $F=100$ according to this invention as outlined above is given in the following examples, in which the lens elements are numbered from front to rear, N is the index of refraction of each lens element for the D line, V is the index of dispersion, and R, T and S refer respectively to the radii of curvature of the lens surfaces, the thicknesses of the lens elements and the airspaces between the elements, numbered by subscript from front to rear.

EXAMPLE 1
$F=100$  $f/2.7$

| Lens | $N_d$ | V | Radii | Thicknesses and Spacings |
|---|---|---|---|---|
| Diaphragm | | | | $S_0=17.4$ |
| I | 1.75 | 52.4 | $R_1=49.2$ | $T_1=22.1$ |
| | | | $R_2=1017.5$ | $S_1=2.2$ |
| II | 1.69 | 31.1 | $R_3=-121.1$ | $T_2=14.6$ |
| | | | $R_4=34.9$ | $S_2=4.2$ |
| III | 1.53 | 51.6 | $R_5=150.0$ | $T_3=5.7$ |
| IV | 1.75 | 52.4 | $R_6=34.8$ | $T_4=10.8$ |
| | | | $R_7=-82.0$ | |

EXAMPLE 2
$F=100$  $f/2.7$

| Lens | $N_d$ | V | Radii | Thicknesses and spacings |
|---|---|---|---|---|
| Diaphragm | | | | $S_0=18.3$ |
| I | 1.75 | 50.6 | $R_1=50.3$ | $T_1=22.0$ |
| | | | $R_2=-284.2$ | $S_1=1.7$ |
| II | 1.69 | 30.9 | $R_3=-93.2$ | $T_2=14.7$ |
| | | | $R_4=34.6$ | $S_2=3.8$ |
| III | 1.53 | 51.6 | $R_5=434.8$ | $T_3=5.7$ |
| IV | 1.75 | 50.6 | $R_6=34.6$ | $T_4=10.9$ |
| | | | $R_7=-74.1$ | |

As can be seen from these two examples, the front component may be either meniscus as in the first example, or convex as in the second example. In both examples the outer components may be in edge contact with the inner component. Both the lenses described above are designed for a maximum half-field angle of 14.34°.

As shown by the curves in FIG. 2 for Example 1 and in FIG. 3 for Example 2, the above lenses are corrected to such a degree that spherical aberrations for the C, D and F lines of the spectrum are all less than ⅓ of a percent of the effective focal length, and the sagittal and tangential astigmatisms and distortion are all less than approximately ½ percent of the effective focal length of the lens.

Although the invention has been described in considerable detail with reference to certain preferred embodiments thereof, it will be understood that variations and modifications can be effected without departing from

I claim:

1. A photographic objective, having an equivalent focal length $F=100$, and comprising three spaced optically aligned components, the front component being a simple positive meniscus element, the middle component being a simple negative biconcave element, and the rear component consisting of two cemented elements of opposite refractive power, the cemented surface of said rear component being convex towards the middle component, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_d$ | V | Radii | Thicknesses and Spacings |
|---|---|---|---|---|
| Diaphragm | | | | $S_0=17.4$ |
| I | 1.75 | 52.4 | $R_1=49.2$ | $T_1=22.1$ |
| | | | $R_2=1017.5$ | |
| | | | | $S_1=2.2$ |
| II | 1.69 | 31.1 | $R_3=-121.1$ | $T_2=14.6$ |
| | | | $R_4=34.9$ | |
| | | | | $S_2=4.2$ |
| III | 1.53 | 51.6 | $R_5=150.0$ | $T_3=5.7$ |
| IV | 1.75 | 52.4 | $R_6=34.8$ | $T_4=10.8$ |
| | | | $R_7=-82.0$ | |

2. A photographic objective, having an equivalent focal length $F=100$, and comprising three spaced optically aligned components, the front component being a simple positive convex element, the middle component being a simple negative biconcave element, and the rear component consisting of two cemented elements of opposite refractive power, the cemented surface of said rear component being convex towards the middle component, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_d$ | V | Radii | Thicknesses and spacings |
|---|---|---|---|---|
| Diaphragm | | | | $S_0=18.3$ |
| I | 1.75 | 50.6 | $R_1=50.3$ | $T_1=22.0$ |
| | | | $R_2=-284.2$ | |
| | | | | $S_1=1.7$ |
| II | 1.69 | 30.9 | $R_3=-93.2$ | $T_2=14.7$ |
| | | | $R_4=34.6$ | |
| | | | | $S_2=3.8$ |
| III | 1.53 | 51.6 | $R_5=434.8$ | $T_3=5.7$ |
| IV | 1.75 | 50.6 | $R_6=34.6$ | $T_4=10.9$ |
| | | | $R_7=-74.4$ | |

References Cited
UNITED STATES PATENTS 2,732,762   1/1956   Lange et al.     350—227
2,764,063   9/1956   Lange     350—227

DAVID SCHONBERG, Primary Examiner
R. J. STERN, Assistant Examiner

U.S. Cl. X.R.

350—227